United States Patent Office 3,488,347
Patented Jan. 6, 1970

3,488,347
PROCESS FOR PREPARING 16α,17α-DIHYDROXY-PROGESTERONE ACETOPHENIDE
Salvatore J. Brancato, Lafayette Hill, and Joe M. Hill and Elizabeth Huang, Philadelphia, Pa., assignors to Smith Kline & French Laboratories, Philadelphia, Pa., a corporation of Pennsylvania
No Drawing. Filed May 5, 1967, Ser. No. 636,255
Int. Cl. C07c 173/00, 167/00
U.S. Cl. 260—239.55          4 Claims

ABSTRACT OF THE DISCLOSURE

A new process for preparing 16α,17α-dihydroxyprogesterone acetophenide, a potent progestational agent, which comprises forming the acetophenide of 16,17-dihydroxypregnenolone then oxidizing this product at position 3. Certain new intermediates are also described.

This invention relates to a new process and intermediates for preparing 16α,17α-dihydroxyprogesterone acetophenide ("Droxone") or acetonides. This acetophenide in the form of its isomer VI in which the phenyl portion of the acetophenide is fixed on the underside of the steroid nucleus is a long acting progestational agent while the other isomer is almost inactive (J. Fried et al., Chem. & Ind., 1961, 465). "Droxone" was originally prepared by forming 16α,17α-dihydroxyprogesterone and then forming the acetophenide (U.S. Patent No. 2,941,997). The starting material in the prior art process (16-dehydroprogesterone) is obtained in low yield since it is prepared by oxidizing dehydropregnenolone which has a sensitive 16,17-double bond. Oxidation of a steroid compound having such a sensitive center results in by products due to over-oxidation at C-17 or D-homo rearrangement giving poor yields.

We have unexpectedly found that "Droxone" and similar compounds—either acetal or ketal derivatives or congeners have 6-substituents (J. Fried et al., Chem. & Ind. 1961 466)—can be prepared in high yield and, in the case of "Droxone," with the proper isomeric form by the following reaction;

is usually about 80–90%. The amount of perchloric catalyst may run from 0.05 part to 0.4 part. Beyond this range no further practical advantage is realized. The amount of iodine catalyst is less critical. The time of reaction may vary from 2–6 hours. The iodine catalyzed reaction has been found to give unexpectedly high yields.

The acetophenide (II) is then oxidized to the progesterone (III) using an Oppenauer oxidation, a modified chromic oxide-acetic acid, or a modified Jones oxidation. The oxidation step has been found not to affect the isomer form of the product appreciably but may vary with individual reaction conditions reflecting different unit costs and yields.

Using the Oppenauer reaction the acetophenide is oxidized using aluminum isopropylate-cyclohexanone in an inert solvent such as toluene.

The modified Jones oxidation involves dibromination at positions 5, 6 to give 5,6-dibromo-3β,16α,17α-trihydroxypregnane-20-one then oxidation under Jones conditions, that is, using dilute acetone solution at about 0–5° C. with dilute Jones reagent (chromic oxide in dilute sulfuric acid). The reaction is run rapidly at below room temperature (0–10° C.) for from 10–15 minutes. After oxidation the 3-oxo-5,6-dibromo compound is debrominated usually using zinc-acetic acid to give the 3-oxo-5,6-dehydro intermediate admixed with some of the desired progesterone. Complete isomerization is effected by further treatment under acid conditions such as with hydrochloric acid. Variations of these reaction conditions are described in U.S. Patent No. 3,187,025. Running the modified Jones reaction in this way gives yields substantially higher and with less unit cost than standard oxidation methods.

Alternatively (I) is brominated as described then oxidized using chromic acid in dilute aqueous acetic acid at 20–25° C. in the presence of an organic solvent such as methylene chloride followed by similar debromination and isomerization steps. The yields run about 85% overall. In both of these procedures on a commercial scale the four chemical steps can be run consecutively without isolation of the intermediate products.

The intermediate 5,6 - dibromo - 3β,16α,17α-trihydroxypregnane-20-one however is a new compound and part

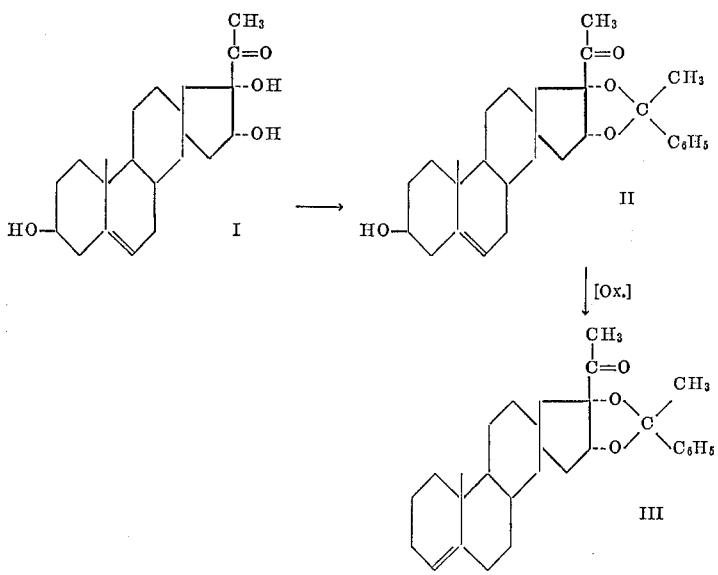

The dihydroxypregnenolone (I) is converted to its acetophenide (II) by reaction with an excess of acetophenone using perchloric acid or preferably iodine as catalyst most conveniently at from about room temperature up to about 100° C. The separated yield of the desired isomer of this invention as is the acetophenide of the dihydroxypregnenolone (II).

The following examples will illustrate but not limit this invention. Certain further variations will be apparent to those skilled in the art.

EXAMPLE 1

Preparation of 3β,16α,17α-trihydroxy-5,6-pregnene-20-one-16,17 acetophenide (A) Add 35 g. 3β,16α,17α-trihydroxy-5-pregnene-20-one, 350 ml. acetophenone (distilled) and 3.5 ml. 70% perchloric acid to a three neck round bottom flask. Agitate for 3 hours at room temperature (20–25° C.). Add 400 ml. methylene chloride and 100 ml. water. Neutralize the reaction mixture with 10% sodium hydroxide solution. Separate the methylene chloride layer and wash with water. Extract the aqueous layers with methylene chloride and combine the neutralized organic layers. Distill to remove the methylene chloride, then remove the acetophenone under vacuum to dryness. Add 175 ml. acetone, heat to dissolve and filter the solution if turbid. Concentrate the solution to 70 ml. and add 35 ml. hexane. Cool, filter and wash with 1:1 acetone/hexane, followed by hexane to give the acetophenide isomer. Yield—28.8 g.; 63.6% of theory; M.P. 170–173° C.

(B) The ingredients and reaction time are similar. After the 3 hour reaction period, the reaction is neutralized with 10% sodium hydroxide solution, and the acetophenone is removed by steam distillation. The aqueous slurry was extracted with methylene chloride and the methylene chloride layer washed with water. The aqueous layers are extracted with methylene chloride and the methylene chloride layers combined. Distilled to remove the methylene chloride, and evaporated to dryness under vacuum near the end. Add 175 ml. acetone and crystallize as above. Yield—31.0 g.; 68.6% of theory; M.P. 172–175° C.

Material obtained contains 1-isomers as above.

(C) Add 10 g. 3β,16α,17α-trihydroxy-5-pregnen-20-one to flask containing 100 ml. acetophenone (distilled). Add 0.6 g. iodine and warm to 50–60° C. Maintain temperature for 2 hours. Complete solution occurs during first hour. Cool to room temperature, dilute with methylene chloride. Add, with vigorous stirring, 7 g. of sodium thiosulfate in 50 ml. water to decolorize iodine. Separate aqueous layer, wash organic layer twice with water. Steam distill to recover excess acetophenone. Dissolve residue in methylene chloride, filter solution to clarify. Concentrate and recrystallize from acetone:hexane. Cool filter and wash with hexane to give the acetophenide isomer. Yield—10.6 g.; 80–85% of theory; M.P. 170–174° C.

EXAMPLE 2

Preparation of 16α,17α-dihydroxyprogesterone acetophenide (A) Oppenauer oxidation.—Forty grams of pregnentriolone acetophenide is added to 800 ml. dry toluene and 200 ml. cyclohexanone. The reaction mixture is heated to 90–100° C., 16 grams aluminum isopropylate is added after which the reaction is heated to reflux. Reflux, with partial take-off, for 45 minutes. Add water and filter off aluminum precipitate. Rinse precipitate with toluene and combine toluene layers. The toluene and cyclohexanone-cyclohexanol are removed by steam distillation. The reaction mixture is extracted with methylene chloride. The methylene chloride solution is concentrated to a very thick slurry, 200 ml. of methanol is added and concentrated to a volume of about 80 ml. The mass is cooled to 0–5° C. Solids are filtered and washed. Alternatively, the solids after steam distillation are filtered and recrystallized from methanol.

(B) Modified chromic acid-acetic acid oxidation.—Thirty grams of pregnentriolone acetophenide in 75 ml. of methylene chloride is cooled to 0° C., 0.36 ml. of pyridine is added. A solution of 11.15 grams of bromine in 14 ml. of methylene chloride is added. Maintain temperature below 10° C. Add a solution of 90 ml. acetic acid-9 ml. water. A solution of 11.5 grams CrO₃/8.0 ml. water/14 ml. acetic acid is added with cooling, holding the temperature between 20–25° C. Stirring is continued for an additional 1.5 hours.

Thirty-eight ml. of methylene chloride is added, then water. The mixture is stirred and then allowed to settle. The methylene chloride layer is separated, washed again with water and separated once again. Forty ml. methanol, and 5.5 ml. acetic acid are added to the methylene chloride layer and the solution is debrominated with 6.5 grams of zinc dust in the standard manner. After the decantation of solvent from zinc, 50 ml. methanol is added to organic layer followed by 6 ml. of a chromous chloride solution. The reaction mixture is blanketed with a layer of nitrogen or carbon dioxide gas and allowed to react for 5 minutes. Seven ml. of conc. HCl is added and solution is stirred for 30 minutes. Water is added, the methylene chloride layer is separated, washed with 10% caustic solution, then with water to neutrality. The methylene chloride solution is concentrated to a thick slurry, 150 ml. methanol is added and concentration to a volume of about 60 ml. is effected. The mass is chilled to 0° C., the solids filtered off, giving a yield of: 16α,17α-dihydroxyprogesterone acetophenide of about 85%; M.P. 147–152° C.; $R_x$ from methanol gave M.P. 151–153° C.

(C) Modified Jones oxidation.—Forty grams of pregnentriolone acetophenide in 160 ml. of methylene chloride is cooled to 5–8° C. 1.6 ml. of pyridine is added. A solution of 16 grams of bromine in 18 ml. of methylene chloride is added. Acetone (480 ml.) is added and the solution cooled back to 0–5° C. A solution of 8 N Jones reagent ($CrO_3$, $H_2SO_4$, $H_2O$) is added as rapidly as possible, holding the temperature below 23–25° C. Time of addition should be about 10–15 minutes. Stirring is continued for an additional 30 minutes after all the Jones reagent has been added.

Two hundred eighty ml. of methylene chloride is added, then 700 ml. of water, the mixture is stirred and warmed up to 30° and let stand to separate the methylene chloride layer. This layer is washed with water, 120 ml. of methanol and 20 ml. of acetic acid added, and debrominated with 14 grams of zinc dust in the usual manner. After decantation of solvent from zinc, temperature is adjusted to 30° C., 16 ml. of concentrated hydrochloric acid is added, and solution stirred for 30 minutes. Water (700 ml.) is added, the methylene chloride layer is separated, washed with 10% caustic solution, then with water to neutrality. The methylene chloride solution is concentrated to a very thick slurry, 200 ml. of methanol is added and concentration to a volume of about 80 ml. is effected. The mass is chilled to 0° C. and stirred for 1 hour. Filtered off solids, giving a yield of: 16α-17α-dihydroxyprogesterone acetophenide of about 88%; M.P. 148–152° C.; $R_x$ from methanol gave M.P. 150–153° C.

$$E_{1\%}^{cm} -358; [\alpha]_D +51$$

EXAMPLE 3

Preparation of 5,6-dibromo-3β,16α,17α-trihydroxypregnan-20-one acetophenide

To a 10 g. solution of the acetophenide of 3β,16α,17α-trihydroxy-Δ⁵-pregnen-20-one in 25 ml. methylene chloride with 0.24 ml. pyridine at 0° C. is added 3.3 g. bromine in 5.0 ml. methylene chloride. In about 3 minutes a precipitate of the dibromide forms and the mixture is stirred at 0° C. for ½ hour. The material is filtered, washed with cold methylene chloride to obtain a first crop with M.P. 117–20° C. $[\alpha]_D$—53 (1% chl); $Br_2$ theory 26.18%; found 26.0%. A second crop obtained by concentration of the mother liquors followed by precipitation from ether gives an over-all yield of 75–80% of theory. In practice the dibromide may not be isolated, but converted to the proper 3-keto-Δ⁴ derivative by oxidation, debromination and isomerization in one continuous operation as previously outlined in Example 2.

What is claimed is:

1. The process for preparing progestationally active 16α,17α-dihydroxyprogesterone acetophenide comprising reacting 3β,16α,17α-trihydroxy-5-pregnen-20-one with an excess of acetophenone in the presence of perchloric acid or iodine catalyst to form 3β,16α,17α-trihydroxy-5-pregnen-20-one acetophenide, selective bromination of said 3β,16α,17α-trihydroxy-5-pregnen-20-one acetophenide at positions 5 and 6 to give 5,6-dibromo-3β,16α,17α-trihydroxypregnan-20-one acetophenide, oxidizing said dibromide to give the 3-keto-5,6-dibromide, debromination of said dibromide with zinc to give the 3-keto-$\Delta^{5,6}$ intermediate and isomerizing said 3-keto-$\Delta^{5,6}$ intermediate under acid conditions.

2. The method of claim 1 in which the Jones reagent is used for the oxidation step.

3. The method of claim 1 in which chromic oxide-acetic acid is used for the oxidation step.

4. 5,6-dibromo-3β,16α,17α-trihydroxy pregnan-20-one acetophenide.

References Cited

UNITED STATES PATENTS

| 3,021,345 | 2/1962 | Waddington-Feather et al. 260—397.4 |
| 3,071,581 | 1/1963 | Zderic et al. _ _ _ _ _ _ 260—239.55 |
| 3,274,178 | 9/1966 | Julian et al. _ _ _ _ _ _ 260—239.55 |

OTHER REFERENCES

Djerassi; Steroid Reactions, Holden-Day, Inc., 1963, p. 116 relied on.

ELBERT L. ROBERTS, Primary Examiner

U.S. Cl. X.R.

260—397.4, 999